May 23, 1933.       B. ENGELS       1,910,759
DRAWING NOZZLE FOR THE MANUFACTURE OF FLASHED GLASS
Filed March 31, 1932
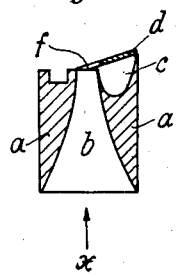
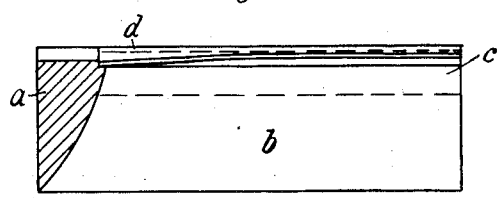
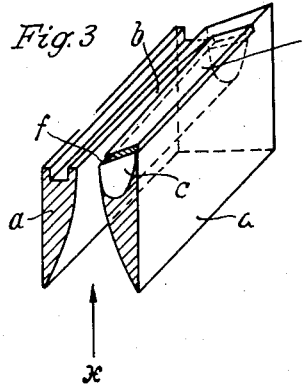
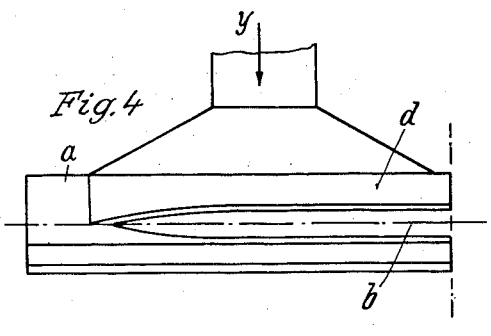
B. Engels
INVENTOR
By: Marks & Clerk
Attys Patented May 23, 1933

1,910,759

UNITED STATES PATENT OFFICE

BERNHARD ENGELS, OF WALDENBURG-ALTWASSER, GERMANY

DRAWING NOZZLE FOR THE MANUFACTURE OF FLASHED GLASS

Application filed March 31, 1932, Serial No. 602,313, and in Germany May 15, 1931.

The present invention relates to a special construction of the known drawing nozzles dipping into the composition, used in manufacturing doubled or flashed glass.

According to this invention the walls of the drawing nozzle are to be furnished on one or both sides of the drawing slit with spaces provided with corresponding admissions to take up the flashed glass which passes over the inner edge of the spaces on to the glass band drawn out of the slit. Through the arrangement of comparatively deep spaces, only a thin wall is obtained between the slit itself and the space for holding the flashed glass, whereby the flashed glass contained in this space is getting heated by the ground glass constantly drawn upwards, so that the flashed glass is always kept in the necessary liquid state.

The space or spaces for holding the flashed glass are covered by a plate so far as to leave free, at the inner edge of the spaces, a slit just sufficient for the emersion of the flashed glass. The introduction of the flashed glass into the spaces of the nozzle may be effected in any suitable manner.

The accompanying drawing is to show, by way of example, the construction of the object of this invention in which—

Figure 1 is a section of this new drawing nozzle.

Fig. 2 is a longitudinal section of the nozzle.

Fig. 3 is a section of it in perspective view.

Fig. 4 shows the nozzle seen from above.

$a$ is the body of the nozzle provided with a slot $b$ through which the ground glass constantly wells up whence it gets drawn out into a glass band.

According to this invention the nozzle $a$ is provided on one side of the slot $b$ with a deep groove $c$ serving to hold the flashed glass, groove $c$ being arranged so that only a comparatively thin partition is left in the body between the slot $b$ and groove $c$.

The groove $c$ is closed at the top by a plate $d$ which is arranged so that between it and the edge of the groove $c$ a gap $f$ remains through which the flashed glass can emerge and get on the ground glass band.

What I claim is:—

1. In a drawing nozzle for dipping into a composition for the manufacture of doubled or flashed glass, a nozzle body having a slot therethrough and provided on one side of the slot with a groove serving to hold the flashed glass passing over the inner edge of the groove on to the glass band drawn outwardly through the slot.

2. A nozzle as claimed in claim 1, wherein there is provided a plate for covering the groove in such a way that at the inner edge of the said groove there remains a free narrow slit for emersion of the flashed glass.

In testimony whereof I have signed my name to this specification.

BERNHARD ENGELS.